Dec. 5, 1939.   H. W. HEISER   2,182,510
PRODUCTION OF DOUBLE FLUORIDES OF ALKALI METALS AND ALUMINUM
Filed July 29, 1938
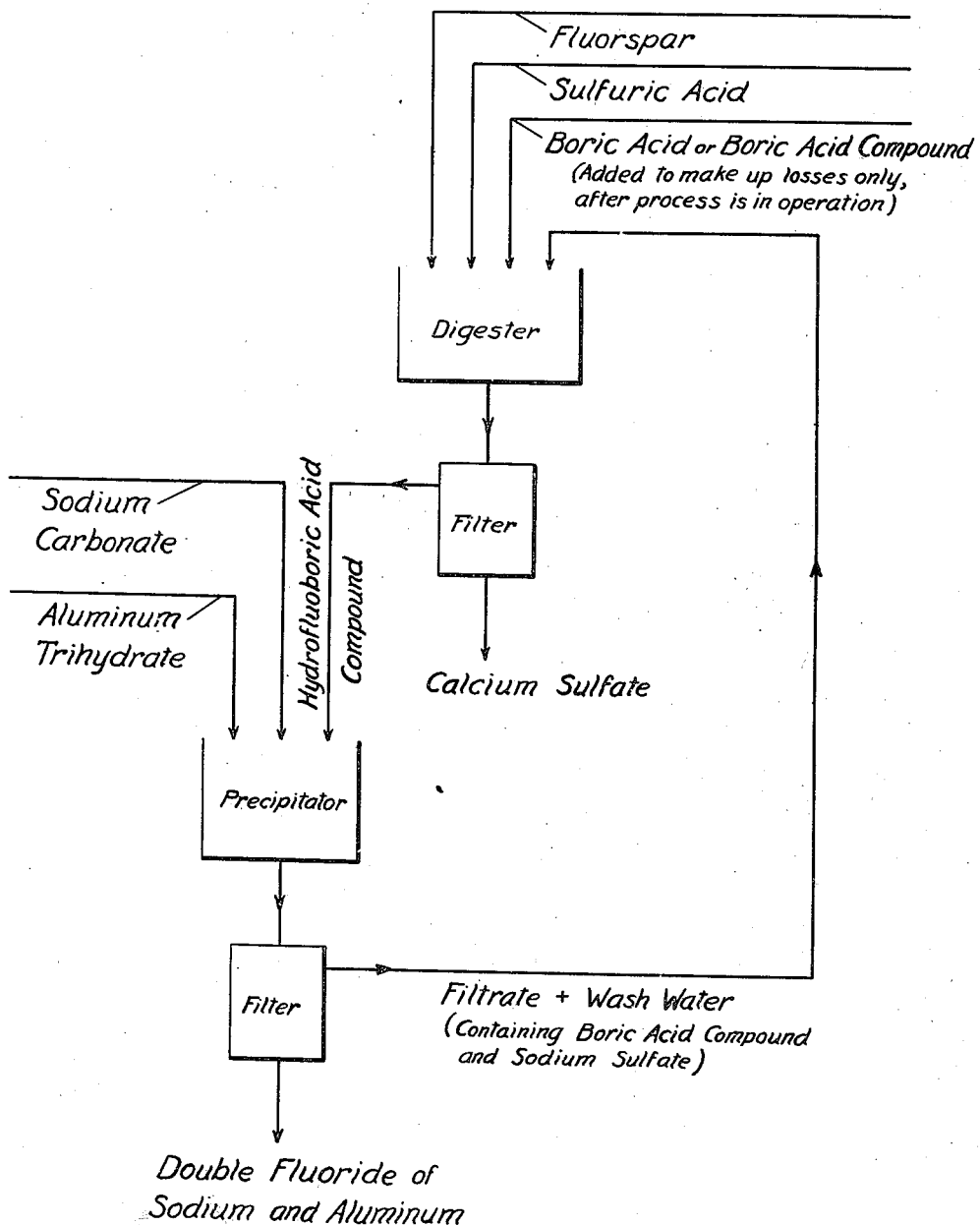
INVENTOR
Harold W. Heiser
BY
ATTORNEY Patented Dec. 5, 1939

2,182,510

UNITED STATES PATENT OFFICE 2,182,510

PRODUCTION OF DOUBLE FLUORIDES OF ALKALI METALS AND ALUMINUM

Harold W. Heiser, East St. Louis, Ill., assignor to Aluminum Company of America, Pittsburgh, Pa., a corporation of Pennsylvania Application July 29, 1938, Serial No. 221,993

20 Claims. (Cl. 23—88)

The invention which forms the subject of my present application (a continuation in part of my copending application Serial No. 144,413, filed May 24, 1937), relates to the production of double fluorides of the alkali metals and aluminum. Double fluorides of these metals have found more or less extensive use in industry, particularly in the production of metallic aluminum from its ores, and since the salts occur only rather sparingly in nature, various methods have been proposed for synthetically producing them in pure form by chemical reaction, as for example by treating fluorspar with sulfuric acid to produce hydrofluoric acid and treating alumina and alkali metal compounds with the acid so obtained. Such methods give double fluorides of satisfactory purity if the reactants are themselves pure, but natural fluorspar pure enough to yield hydrofluoric acid of sufficient purity is itself costly, and purification of low grade spar, of which large natural deposits are available, involves an important item of cost. On the other hand, if low grade spar is used without first being purified, the double fluorides ultimately obtained by prior processes are contaminated with various impurities, especially silica. Further, methods which involve the production of hydrofluoric or hydrofluosilicic acid require extreme care in protecting the workmen from injury by these highly corrosive and dangerous gases.

I have accordingly been led to devise my present invention, which has for an important object the provision of a method adapted to produce from low grade fluorspar double fluorides of the alkali metals and aluminum of high purity without the necessity of purifying the spar. Another object is to provide a method of making the double fluorides directly from fluorspar without the employment of a fluorine-containing gas or the evolution of such gas at any stage. A further object is to provide a method of producing double fluorides of alkali metals and aluminum, particularly sodium aluminum fluoride, substantially free from silica. Still another object is to provide a method by which double fluorides of various ratios of aluminum fluoride to alkali metal fluoride can be produced.

In general the method of my invention comprises treating a solution of hydrofluoboric acid compound with material capable of dissociating to form aluminum ions and alkali metal ions in the solution. These terms are used to include not only ions of the metals per se, but also complex ions containing the metals, for the reason that it is not always possible to determine with certainty whether, when compounds are used as the source of aluminum and the selected alkali metal, they give ions of the metals per se, or complex ions containing the metals, or both. In a specific form of my invention the method comprises the steps of treating fluorspar with sulfuric acid in relatively dilute aqueous solution containing a boric acid compound and producing thereby a hydrofluoboric acid compound in solution, and introducing into the solution aluminum and alkali metal compounds in proportions which will give a desired ratio of the two fluorides in the double fluoride produced by the reaction. In this way the physical properties and chemical constitution of the double fluorides can be readily controlled. For example, double fluoride having an excess of aluminum fluoride of 20 per cent or more as compared with cryolite and thus corresponding closely to the natural mineral chiolite, which is reported to have the formula $5NaF.3AlF_3$, is easily obtainable.

In my copending application, Serial No. 144,412, filed May 24, 1937, I have described a method for the production of hydrofluoboric acid compounds, by which term is meant hydrofluoboric acid and the fluoborate salts, from fluorspar ores, in which fluorspar is digested with an aqueous solution of sulfuric acid containing a boric acid compound. By this method, I have found that I can obtain substantially complete recovery of the fluorine content of fluorspar ores in the form of a soluble compound, at relatively low temperatures, without the intermediate formation of any fluorine-containing gases. Furthermore, I have found that a solution of hydrofluoboric acid compound which is substantially free from silica may be produced by this method even though low grade fluorspar containing a relatively high percentage of silica is used as the starting material.

While my invention is applicable to the production of double fluorides of aluminum and alkali metals generally, it will be more particularly described in connection with the preferred form of the invention, in which the double fluorides of sodium and aluminum are produced. I do not intend, therefore, that my invention shall be limited to or circumscribed by the specific details of operation hereinafter set forth, except as they are recited in the appended claims. The term "sodium aluminum fluoride" as used herein and in the appended claims is intended to include cryolite and double fluorides of sodium and aluminum in which the ratio of sodium fluoride to aluminum fluoride differs from their ratios in cryolite and chiolite. For the purposes of description, I have adopted the use of the term "excess aluminum fluoride" to describe the aluminum fluoride present (in the product) which is over and above the amount of aluminum fluoride in cryolite, $3NaF.AlF_3$.

In producing sodium aluminum fluoride according to my invention, a solution of hydrofluoboric acid compound is first prepared in any suitable manner, preferably by synthesizing the desired compound in solution, for example by the method described in my copending application for patent, Serial No. 144,412, above referred to. In this case fluorspar is digested with an aqueous solution of sulfuric acid containing boric acid or a compound capable of forming boric acid in solution. The sulfuric acid is preferably a 10 to 20 per cent solution and is used in sufficient amount to supply the theoretical quantity or somewhat less than the theoretical quantity of the acid required to decompose all of the calcium fluoride or fluorspar. The boric acid compound is preferably present in an amount somewhat in excess of that required to combine with all of the fluorine in the calcium fluoride to form a hydrofluoboric acid compound. The digestion is preferably carried out for a period of 1 to 3 hours at a temperature of about 70 to 100° C. to effect substantially complete reaction. The digestion may be carried out in one or more stages, as desired. After completion of the digestion, the liquor containing the hydrofluoboric acid compound is cooled and filtered off from the calcium sulfate residue. The solution thus formed may be treated directly according to the method of the present invention to produce cryolite or a double fluoride of aluminum and sodium having an aluminum fluoride content in excess.

In the practice of my invention I prefer to add the aluminum not in the form of the metal itself but as a compound to the hydrofluoboric acid solution, preferably as aluminum hydrate and particularly aluminum trihydrate ($Al_2O_3.3H_2O$), and the sodium also as a compound, in the form of sodium carbonate; though, alternately, all or part of the sodium compound may be added in other forms, as for example caustic soda, sodium bicarbonate, sodium sulfate, or sodium bisulfate. The aluminum trihydrate may first be added to the solution of the hydrofluoboric acid compound, and the sodium compound subsequently added, or the aluminum trihydrate may be mechanically mixed with the sodium compound, or the two may be added alternately in small quantities.

The aluminum trihydrate is preferably added to the solution of hydrofluoboric acid compound in an amount equal to or greater than that required to supply the stoichiometrical quantity of aluminum needed to form cryolite ($3NaF.AlF_3$) by reaction with the fluorine of the hydrofluoboric acid compound. The amount of aluminum trihydrate added will depend upon the proportion of excess aluminum fluoride (over that required to form cryolite) which is desired in the resulting product. The sodium compound is usually added in an amount about equal to or less than the amount necessary to bring the sodium content of the mixture to about the stoichiometrical quantity required to form cryolite with the fluorine available in the solution of the hydrofluoboric acid compound. In those instances where it is desired to produce a sodium aluminum fluoride compound having excess aluminum fluoride, the amount of sodium compound added to the solution should be less than the stoichiometrical amount required to form cryolite with the fluorine of the solution of the hydrofluoboric acid compound. In all cases it is preferable that the compounds of aluminum and sodium be added in amounts so that the sodium or aluminum compounds will be entirely precipitated as sodium aluminum fluoride, to avoid having the compounds added build up in the liquor singly.

While the required reaction will proceed at ordinary temperature, a temperature of 50° to 100° C. is preferred. When the precipitation of sodium aluminum fluoride is substantially complete the precipitate is filtered off and washed. With the addition of sulfuric acid the filtrate, containing the boric acid or boric acid compound, may be used in the digestion of further quantities of fluorspar for the production of the solution of the hydrofluoboric acid compound.

The process above described may conveniently be conducted as a cyclic process as shown in the accompanying flow sheet, the solution of the hydrofluoboric acid compound being continuously reproduced by the digestion of additional quantities of fluorspar with the spent liquor containing the boric acid or boric acid compound and additional amounts of sulfuric acid. The liquor thus regenerated is used for the further production of double fluoride, which is removed as a precipitate, the filtrate containing the boric acid compound being used in the digestion of further quantities of fluorspar with added sulfuric acid, and so on.

In practicing my invention I prefer (though it is not necessary) to maintain in the process liquor a quantity of alkali metal sulfate. In the production of the hydrofluoboric acid compound from fluorspar, the alkali metal sulfate appears to repress the formation of undesirable calcium compounds in the process liquor. I have found it most advantageous to have the alkali metal sulfate present as the salt of the alkali metal which enters into the double fluoride. For example, in the production of double fluorides of sodium and aluminum, I would use sodium sulfate. For most purposes, I prefer to have the sodium sulfate present in amounts equal to about 50 grams per liter of the solution of the hydrofluoboric acid compound, though this proportion may be widely varied.

When the hydrofluoboric acid compound is treated with aluminum trihydrate and sodium carbonate as above described, the sodium sulfate appears to be effective in maintaining in the precipitated product a particle size similar to that of the added aluminum trihydrate. When aluminum trihydrate is added to the hydrofluoboric acid compound containing sodium sulfate, the following skeleton equation expresses the probable reaction involved:

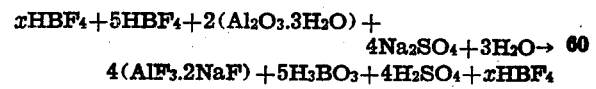
$$xHBF_4 + 5HBF_4 + 2(Al_2O_3.3H_2O) + 4Na_2SO_4 + 3H_2O \rightarrow 4(AlF_3.2NaF) + 5H_3BO_3 + 4H_2SO_4 + xHBF_4$$

Enough of the sodium in the sodium sulfate appears to combine with the aluminum trihydrate immediately upon its addition to maintain the particle size. When the reaction is completed by the addition of sodium carbonate, some of the resulting precipitated sodium aluminum fluoride compound is of a particle size substantially that of the initially added aluminum trihydrate. It is thus possible to control, within limits, the grain size of the cryolite or the sodium aluminum fluoride compound precipitated from the solution by adding the aluminum trihydrate in a pre-selected particle size. By making this coarse, we may facilitate filtration and prevent dust losses which might occur in handling or use if too much fine dust is present.

As previously stated, the compounds of aluminum and sodium may be added to the solution of hydrofluoboric acid compound in several ways. If the aluminum compound is aluminum trihydrate, and if it is added to the solution of hydrofluoboric acid compound before any of the sodium compound is added, the subsequent rate of precipitation is greater than if the two compounds are added as a mixture or alternately in small quantities. This is probably due to the fact that the aluminum trihydrate is more rapidly attacked when the concentration of the hydrofluoboric acid compound in the solution has not been decreased by addition of the sodium compound. When the materials are added in this manner, the process results in the production of a sodium aluminum fluoride compound having an excess of aluminum fluoride as compared with cryolite, as may be seen from the following specific example.

Hydrofluoboric acid was prepared from one liter of an aqueous solution containing 250 grams sulfuric acid, 50 grams sodium sulfate and 100 grams boric acid, by digesting in this solution 300 grams (an excess) of fluorspar ($CaF_2$) at 90° C. for two hours. The resulting liquor was filtered from the insoluble residue and combined with a small amount of replacement wash water. The temperature of the hydrofluoboric acid was then allowed to drop to about 30° C. This cooling caused considerable of the dissolved calcium sulfate to precipitate from the solution, and this was removed. Essentially, the hydrofluoboric acid solution had the following composition:

| | Grams per liter |
|---|---|
| Hydrofluoboric acid ($HBF_4$) | 94.8 |
| Sodium sulfate ($Na_2SO_4$) | 40.9 |

A 250 cc. portion of the clear cooled liquor was heated to 95° C., at which temperature aluminum trihydrate was added to the amount of 15.4 grams and digested for 30 minutes. Then 16.9 grams of sodium carbonate were slowly added and the digestion continued until a total period of about two hours had elapsed. The resulting "cryolite", or double fluoride of aluminum and sodium, was grainy and filtered readily. After the product was washed and dried, analysis showed it to contain 71.4 per cent cryolite (calculated as $3NaF.AlF_3$) and 22.75 per cent excess aluminum fluoride ($AlF_3$).

The following specific examples also will show how, by variations in the mode of addition and in the ratios of aluminum trihydrate to sodium carbonate, the composition of the resulting sodium aluminum fluoride compound can be controlled. It may be seen from these examples that by proper variation, a sodium aluminum fluoride compound can be prepared containing from about 2 per cent to about 20 per cent of aluminum fluoride in excess of that required for cryolite, $3NaF.AlF_3$.

1. A mixture of 15.89 grams aluminum hydrate and 28.38 grams sodium carbonate (97% $Na_2CO_3$) was slowly added to 250 cc. of the above hydrofluoboric acid liquor at 95° C., the addition of the mixture being spread over a period of 1 hour, after which the digestion was allowed to continue for another hour. The ratio of $Al_2O_3$ to the NaOH equivalent of the sodium carbonate was .501 and the double fluoride obtained had 1.9 per cent excess $AlF_3$.

2. Using 250 cc. of the liquor, 15.89 grams of aluminum hydrate and 28.38 grams of sodium carbonate (97% $Na_2CO_3$) were added alternately in small amounts. The sodium aluminum fluoride resulting from this procedure contained 2.3 per cent excess $AlF_3$.

3. 20.9 grams of aluminum hydrate were added rapidly to 250 cc. of the liquor above described and allowed to digest at 80° C. for 30 minutes. The temperature of the reaction mixture was then raised to 95° C., and 20.18 grams of sodium carbonate (97% $Na_2CO_3$) were slowly added over a period of about 1 hour. The ratio of aluminum oxide to the NaOH equivalent of the sodium carbonate was .93, and the resulting sodium aluminum fluoride compound contained about 22.8 per cent excess aluminum fluoride.

In another species of the invention (not claimed specifically herein but so claimed in my copending application Serial No. 144,413, above referred to) the aluminum needed for the double fluoride is supplied at least in part by an alkali metal aluminate. This form of the invention will be understood from the following examples, in which sodium aluminum fluoride having substantially the composition of cryolite is produced. For this purpose the solution of hydrofluoboric acid compound is mixed with a solution of sodium aluminate and another sodium compound. The sodium aluminate solution may be of any desired concentration, and I have found that a solution containing about 80 to 100 grams per liter of alumina is preferred. The sodium aluminate solution is preferably used in an amount sufficient to supply the stoichiometrical quantity of alumina required to form cryolite with the fluorine of the solution of the hydrofluoboric acid compound. The additional sodium compound should preferably be used in an amount sufficient to bring the sodium content of the mixture up to an amount equivalent to about 3 atoms of sodium to each atom of aluminum. For this purpose, I prefer to use sodium hydroxide or sodium carbonate, but other sodium salts, such as the sulfate, may be used if desired. While the reaction will proceed at ordinary temperatures, it is generally preferred to heat the mixture at a temperature of between 50 and 100° C. The reaction is continued until precipitation of sodium aluminum fluoride is substantially complete. The precipitated sodium aluminum fluoride is then filtered off and washed. The filtrate containing the boric acid or boric acid compound may be used in the digestion of further quantities of fluorspar for the production of the solution of the hydrofluoboric acid compound if desired, in conjunction with additional amounts of sulfuric acid.

Alternatively, the sodium aluminum fluoride may be prepared from a solution of a hydrofluoboric acid compound by a two-step process in which the hydrofluoboric acid compound is first treated with the sodium hydroxide or sodium carbonate to form a solution of sodium fluoride and borax. If desired, the sodium fluoride may be separated from this solution by fractional crystallization and then dissolved to form a substantially pure sodium fluoride solution, or the solution may be used directly in the subsequent steps of the process. The sodium fluoride solution is treated with the solution of sodium aluminate and an acid to precipitate the sodium aluminum fluoride. The sodium aluminate solution is preferably used in amounts sufficient to supply the stoichiometrical quantities of alumina necessary to form sodium aluminum fluoride with all of the fluorine present in the solution. The acid is preferably added in the form of carbon dioxide gas. The carbon dioxide is added until precipitation of the sodium aluminum fluoride is substantially complete. The reaction is preferably carried out at a temperature of 50 to 100° C. When the precipitation is complete, the sodium aluminum fluoride is filtered off and washed.

The following specific example will serve to illustrate the particular form of the method of my invention in which a solution of hydrofluoboric acid compound is formed from fluorspar, and this solution is treated with sodium aluminate and a sodium compound to produce sodium aluminum fluoride. One hundred and fifty grams of fluorspar containing about 86 per cent $CaF_2$ and about 12 per cent silica were stirred with 500 cubic centimeters of an aqueous solution containing 125 grams of sulfuric acid and 75 grams of borax. The mixture was stirred for about one hour at a temperature of 80° C. and filtered to separate the solution of the hydrofluoboric acid compound from the hydrated calcium sulfate precipitate. After the filtrate was cooled and clarified a 100 cc. portion was diluted with an equal volume of water and heated to about 95° C. To this hot solution there was then added 85 cc. of a solution of sodium aluminate containing 50 grams per liter of $Al_2O_3$ and 77 grams per liter of NaOH. A grainy form of sodium aluminum fluoride formed almost as rapidly as the sodium aluminate solution was trickled into the hot agitated solution of the hydrofluoboric acid compound. Stirring was continued for one hour. The product filtered readily, and after being washed and dried proved to be of high purity, having a fluorine content equivalent to about 95 per cent cryolite.

It is to be understood that the invention is not limited to the specific procedure described in the foregoing specification but can be carried out in other ways without departure from its spirit as defined by the following claims.

I claim:

1. A method for the production of double fluorides of alkali metals and aluminum, comprising treating a solution of a hydrofluoboric acid compound by introducing material dissociating to form aluminum and alkali metal ions in said solution in proportions effecting the precipitation of a double fluoride.

2. A method for the production of double fluorides of alkali metals and aluminum, comprising treating a solution of a hydrofluoboric acid compound with aluminum and alkali metal compounds in proportions effecting the precipitation of a double fluoride.

3. A method for the production of double fluorides of alkali metals and aluminum, comprising treating a solution of a hydrofluoboric acid compound with an aluminum compound and an alkali metal compound in proportions effecting the precipitation of a double fluoride.

4. A method for the production of double fluorides of alkali metals and aluminum, comprising treating a solution of a hydrofluoboric acid compound with aluminum trihydrate and an alkali metal compound in proportions effecting the precipitation of a double fluoride.

5. A method for the production of a double fluoride of sodium and aluminum, comprising treating a solution of a hydrofluoboric acid compound with an aluminum compound and a sodium compound.

6. A method for the production of a double fluoride of sodium and aluminum, comprising treating a solution of a hydrofluoboric acid compound with aluminum trihydrate and sodium carbonate.

7. A method for the production of double fluorides of alkali metals and aluminum, comprising treating a solution of a hydrofluoboric acid compound containing an alkali metal sulfate with an aluminum compound and an alkali metal compound.

8. A method for the production of sodium aluminum fluoride, comprising treating a solution of a hydrofluoboric acid compound with aluminum trihydrate, and subsequently adding a compound of sodium to precipitate a double fluoride of sodium and aluminum having an aluminum content in excess of that of cryolite.

9. A method adapted to produce double fluorides of aluminum and alkali metals substantially free from silica directly from fluorspar containing a large percentage of silica, without the evolution of fluorine or a gaseous compound thereof at any stage, comprising treating fluorspar with an aqueous solution of a strong mineral acid and a boric acid compound and producing thereby a substantially silica free hydrofluoboric acid compound in solution and precipitating a calcium salt, removing the latter, treating the hydrofluoboric acid compound in solution with materials yielding alkali metal and aluminum ions and thereby precipitating a substantially silica free double fluoride of aluminum and the alkali metal and producing a boric acid compound in solution, and separating the double fluoride precipitate from the solution of the boric acid compound.

10. A method for the production of sodium aluminum fluoride, comprising treating a solution of a hydrofluoboric acid compound containing sodium sulfate by introducing material dissociating to form aluminum ion and sodium ion in said solution in proportions effecting the precipitation of a double fluoride.

11. A method adapted to produce double fluorides of aluminum and alkali metals substantially free from silica directly from fluorspar containing a large percentage of silica, without the evolution of fluorine or a gaseous compound thereof at any stage, comprising treating fluorspar with an aqueous solution of a strong mineral acid and a boric acid compound and producing thereby a substantially silica free hydrofluoboric acid compound in solution and precipitating a calcium salt, removing the latter, treating the hydrofluoboric acid compound in solution with aluminum and alkali metal compounds and thereby precipitating a substantially silica free double fluoride of aluminum and the alkali metal and producing a boric acid compound in solution, and separating the double fluoride precipitate from the solution of the boric acid compound.

12. A method for the production of sodium aluminum fluoride, comprising treating a solution of a hydrofluoboric acid compound containing sodium sulfate with an aluminum compound and a sodium compound.

13. A method for the production of sodium aluminum fluoride, comprising treating a solution of a hydrofluoboric acid compound containing sodium sulfate with aluminum trihydrate and sodium carbonate.

14. A method for the production of sodium aluminum fluoride, comprising treating a solution of a hydrofluoboric acid compound containing sodium sulfate with aluminum trihydrate, and subsequently adding a compound of sodium to precipitate a double fluoride of sodium and aluminum having an aluminum content in excess of that of cryolite.

15. A method for the production of sodium aluminum fluoride, comprising treating a solution of a hydrofluoboric acid compound containing sodium sulfate with aluminum trihydrate, and subsequently adding sodium carbonate to precipitate a double fluoride of sodium and aluminum having an aluminum content in excess of that of cryolite.

16. A method adapted to produce a double fluoride of aluminum and sodium substantially free from silica directly from fluorspar containing a large percentage of silica, without the evolution of fluorine or a gaseous compound thereof at any stage, comprising digesting fluorspar with an aqueous solution of sulfuric acid containing a boric acid compound and producing thereby a substantially silica free hydrofluoboric acid compound in solution and precipitating calcium sulfate, removing the latter, treating the hydrofluoboric acid compound in solution with aluminum trihydrate and a sodium compound and thereby precipitating a substantially silica free double fluoride of aluminum and the alkali metal and producing a boric acid compound in solution, and separating the double fluoride precipitate from the solution of the boric acid compound.

17. A method adapted to produce a double fluoride of aluminum and sodium substantially free from silica directly from fluorspar containing a large percentage of silica, without the evolution of fluorine or a gaseous compound thereof at any stage, comprising treating fluorspar with an aqueous solution of sulfuric acid and a boric acid compound and an alkali metal sulfate and producing thereby a substantially silica free hydrofluoboric acid compound in solution and precipitating calcium sulfate, removing the latter, treating the hydrofluoboric acid compound in solution with aluminum trihydrate and a sodium compound and thereby precipitating a substantially silica free double fluoride of aluminum and sodium and producing a boric acid compound in solution, and separating the double fluoride from the solution of the boric acid compound.

18. A method adapted to produce a double fluoride of aluminum and sodium substantially free from silica directly from fluorspar containing a large percentage of silica, without the evolution of fluorine or a gaseous compound thereof at any stage, comprising treating fluorspar with an aqueous solution of sulfuric acid containing a boric acid compound and sodium sulfate and producing thereby a substantially silica free hydrofluoboric acid compound in solution and precipitating a calcium salt, removing the latter, treating the hydrofluoboric acid compound in solution with aluminum trihydrate and sodium carbonate and thereby precipitating a substantially silica free double fluoride of aluminum and the alkali metal and producing a boric acid compound in solution, and separating the double fluoride precipitate from the solution of the boric acid compound.

19. A cyclic method of synthesizing double fluorides of aluminum and alkali metals without the evolution of fluorine or a gaseous compound thereof, comprising treating fluorspar with an aqueous solution of a strong mineral acid and a boric acid compound and producing thereby a hydrofluoboric acid compound in solution and precipitating a calcium salt, removing the latter, treating the hydrofluoboric acid compound in solution with materials yielding alkali metal and aluminum ions and thereby precipitating a double fluoride of aluminum and the alkali metal and producing a boric acid compound in solution, separating the double fluoride precipitate from the solution of the boric acid compound, adding strong mineral acid to the latter solution, treating fluorspar therewith, treating the resulting solution of the hydrofluoboric acid compound with materials yielding alkali metal and aluminum ions, separating the resulting products, and repeating the foregoing steps.

20. A cyclic method of synthesizing a double fluoride of aluminum and sodium without the evolution of fluorine or a gaseous compound thereof, comprising treating fluorspar with an aqueous solution of sulfuric acid containing a boric acid compound and producing thereby a hydrofluoboric acid compound in solution and precipitating calcium sulfate, removing the latter, treating the hydrofluoboric acid compound in solution with aluminum trihydrate and a sodium compound and thereby precipitating a double fluoride of aluminum and sodium and producing a boric acid compound in solution, separating the double fluoride precipitate from the solution of the boric acid compound, adding sulfuric acid to the latter solution, treating fluorspar therewith, treating the resulting solution of the hydrofluoboric acid compound with aluminum trihydrate and a sodium compound, separating the resulting products, and repeating the foregoing steps.

HAROLD W. HEISER.